United States Patent Office 3,001,994
Patented Sept. 26, 1961

3,001,994
SUBSTITUTED DIHYDROBENZOTHIADIAZINES
Frederick Y. Wiselogle, North Brunswick, and Harry L. Yale and Jack Bernstein, New Brunswick, N.J., assignors to Olin Mathieson Chemical Corporation, New York, N.Y., a corporation of Virginia
No Drawing. Filed June 30, 1959, Ser. No. 823,856
10 Claims. (Cl. 260—243)

This invention relates to new dihydrobenzothiadiazines and more particularly to compounds of the general formula

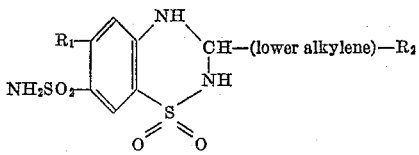

and alkali metal salts thereof, wherein $R_1$ is chloro or trifluoromethyl, and $R_2$ is furyl or thienyl (including lower alkyl substituted derivatives thereof). Particularly preferred are those compounds wherein $R_1$ is trifluoromethyl; the lower alkylene radical is methylene or ethylene; and $R_2$ is furyl or thienyl.

The compounds of this invention are therapeutically useful agents because they are capable of exerting strongly saliuretic and diuretic effects. Thus, the compounds of this invention are administrable parenterally and (preferably) orally in the treatment of conditions requiring saliuretic or diuretic agents. Moreover, it has been surprisingly found that the compounds of this invention are far more active diuretics than are the corresponding 3-unsubstituted and 3-aliphatically substituted derivatives.

The compounds of this invention can be prepared by the process of this invention, which comprises interacting a 2,4-disulfamylaniline of the general formula

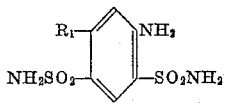

wherein $R_1$ is as hereinbefore defined, with an aldehyde of the general formula $R_2$(lower alkylene)CHO, wherein $R_2$ is as hereinbefore defined, or a reactive derivative thereof, as more fully described hereinafter, thereby yielding the final products of this invention.

If an alkali metal salt is desired, it can be formed by interacting the free dihydrobenzothiadiazine with an alcoholic alkali metal hydroxide (e.g. potassium hydroxide), whereby the alkali metal salt is formed.

In accordance with the method of this invention a 2,4-disulfamyl-analine is reacted with an aldehyde, or a reactive derivative thereof. The 2,4-disulfamyl-aniline reactant can be prepared, as more fully described in the following examples, by interacting an aniline (i.e. 3-chloroaniline and 3-trifluoromethylaniline) with chlorosulfonic acid in the presence of an alkali metal chloride (e.g. sodium chloride) to yield the corresponding aniline-2,4-disulfonyl chloride derivative, the reaction preferably being conducted at an elevated temperature employing at least four equivalents of chlorosulfonic acid; and treating the resulting aniline-2,4-disulfonyl chloride derivative with aqueous ammonia to yield the corresponding 2,4-disulfamylaniline derivative.

The 2,4-disulfamylaniline derivative, thus obtained, is then reacted with an aldehyde or a reactive derivative thereof to give the compounds of this invention. Among the suitable aldehyde reactants may be mentioned: furan-lower alkanals and thiophene-lower alkanals, such as 2-furanacetaldehyde, 2-thiopheneacetaldehyde, 3-thiophene-actealdehyde, α-(2-furan)propionaldehyde, β-(2-thiophene)propionaldehyde, 6-(2-furan)caproaldehyde, β-(2-thiophene)-n-butyraldehyde, and lower alkyl substituted derivatives thereof (e.g. 3-methyl-2-furanacetaldehyde and 3-methyl-2-thienylacetaldehyde).

In addition to the aldehydes mentioned hereinbefore, reactive forms of these compounds may also be used. Thus, polymeric forms may be used or an acetal or enol ether, particularly a di(lower alkyl)acetal may be employed. The reaction is preferably conducted in the presence of an acid catalyst, such as hydrochloric, phosphoric, p-toluene sulfonic, trichloroacetic or sulfuric acid.

The following examples illustrate the invention (all temperatures being in centigrade):

EXAMPLE 1

*3-furfuryl-6-trifluoromethyl-7-sulfamyl-3,4-dihydro 1,2,4-benzothiadiazine-1,1-dioxide*

(a) *Preparation of 5-amino-α,α,α-trifluoro-2,4-toluenedisulfonamide.*—To 100 ml. of 99% chlorosulfonic acid at room temperature is added dropwise 20 g. of m-aminobenzotrifluoride. Subsequently, this mixture is gradually treated with a total of 90 g. of sodium chloride during a period of one hour. The viscous mass resulting is then heated by means of an oil bath to 180° and kept at this temperature for two hours. During this time the reaction mixture becomes solid and stirring is discontinued. This mixture is then cooled by an ice bath and when cool, the reaction mixture is rapidly diluted with 500 ml. of ice cold water and stirred until a fine yellow colored suspension is obtained. The solid is filtered, dried and stirred into 600 ml. of ether. The yellow ether solution is decanted from any insoluble material, washed with water, dried over magnesium sulfate and concentrated from the steam bath to a volume of about 50 ml. This ether solution contains 5-amino-α,α,α-trifluoro-2,4-toluenedisulfonyl chloride, which can be isolated as a crystalline solid.

The ether solution containing the 5-amino-α,α,α-trifluoro-2,4-toluenedisulfonyl, chloride is cooled in an ice bath and treated slowly with 50 ml. of concentrated aqueous ammonia. A vigorous reaction occurs. Finally, the mixture is heated one hour on the steam bath and cooled to give about 8 g. of 5-amino-α,α,α-trifluoro-2,4-toluenedisfulonamide, M.P. about 236–238° after recrystallization from water.

(b) *Preparation of 3-furfuryl-6-trifluoromethyl-7-sulfamyl - 3,4 - dihydro - 1,2,4 - benzothiadiazine - 1,1-dioxide.*—A solution of 31.9 grams of 2,4-disulfamyl 5-trifluoromethylaniline and 11 grams of 2-furanacetaldehyde in 250 ml. of absolute ethanol, containing 0.5 grams of p-toluenesulfonic acid is refluxed for eight hours, filtered hot and diluted with warm water. The solution is then allowed to cool slowly and the crystallized product is then filtered. It is recrystallized from aqueous methanol to give the desired 3-furfuryl-3,4-dihydro-6-trifluoromethyl-1,2,4-benzothiadiazine-7-sulfonamide-1,1-dioxide.

EXAMPLE 2

*Potassium salt of 3-furfuryl-6-trifluoromethyl-1,2,4-benzothiadiazine-7-sulfonamide 1,1-dioxide*

To a solution of 6.6 g. of 85% potassium hydroxide in 100 ml. of 95% ethanol is added gradually with shaking 2.05 g. of 3-furfuryl-6-trifluoromethyl-1,2,4-benzothiadiazine-7-sulfonamide 1,1-dioxide. The solid dissolves. The resulting alcoholic solution is concentrated in vacuo to yield the dipotassium salt of 3-furfuryl-6-trifluoromethyl-1,2,4-benzothiadiazine-7-sulfonamide 1,1-dioxide as a free flowing granular powder.

Similarly, using the equivalent quantity of sodium hydroxide instead of potassium hydroxide, the disodium salt is obtained. Furthermore, if only 3.3 g. of 85% potassium hydroxide is used in Example 2, the monopotassium salt is formed.

EXAMPLE 3

*3-(2-thenyl)-3,4-dihydro-6-chloro-1,2,4-benzothiadiazine-7-sulfonamide-1,1-dioxide*

A solution of 14.3 grams of 5-chloro-2,4-disulfamylaniline and 6.3 grams of 2-thiopheneacetaldehyde in 150 ml. of n-propanol is heated to gentle reflux and 10 ml. of 10% aqueous hydrochloric acid is added. The reaction mixture is refluxed for six hours and then is concentrated under reduced pressure to remove the solvent. The residue is then crystallized from aqueous ethanol to give the desired 3-(2-thenyl)-3,4-dihydro-6-chloro-1,2,4-benzothiadiazine-7-sulfonamide-1,1-dioxide.

EXAMPLE 4

*3-[2-(2-furyl)ethyl]-3,4-dihydro-6-trifluoromethyl-1,2,4-benzothiadiazine-7-sulfonamide-1,1-dioxide*

A solution of 32 grams of 5-trifluoromethyl-2,4-disulfamylaniline and 17 grams of 2-furanpropionaldehyde dimethyl acetal in 300 ml. of ethanol and 10 ml. of 20% aqueous hydrochloric acid is refluxed for three hours, diluted with hot water and allowed to cool. The crystalline solid is removed by filtration and recrystallized from aqueous propanol to give the desired 3-[2(2-furyl)ethyl]-3,4-dihydro-6-trifluoromethyl-1,2,4-benzothiadiazine-7-sulfonamide-1,1-dioxide.

EXAMPLE 5

*3-furfuryl-3,4-dihydro-6-chloro-1,2,4-benzothiadiazine-7-sulfonamide-1,1-dioxide*

A solution of 57 grams of 5-chloro-2,4-disulfamylaniline and 22 grams of 2-furanacetaldehyde in 300 ml. of dioxane containing 0.5 gram of p-toluenesulfonic acid is refluxed for three hours and the dioxane then removed by concentration under reduced pressure. The residue is triturated with hexane and is then crystallized from aqueous methanol to give the desired 3-furfuryl-3,4-dihydro-6-chloro-1,2,4-benzothiadiazine-7-sulfonamide-1,1-dioxide.

EXAMPLE 6

*3-(2-thenyl)-3,4-dihydro-6-trifluoromethyl-1,2,4-benzothiadiazine-7-sulfonamide-1,1-dioxide*

By replacing 14.3 grams of 5-chloro-2,4-disulfamylaniline with 16 grams of 5-trifluoromethyl-2,4-disulfamylaniline in Example 3 there is obtained 3-(2-thenyl)-3,4-dihydro-6-trifluoromethyl-1,2,4-benzothiadiazine-7-sulfonamide-1,1-dioxide.

The invention may be variously otherwise embodied within the scope of the appended claims.

What is claimed is:

1. A compound selected from the group consisting of dihydrobenzothiadiazines of the formula

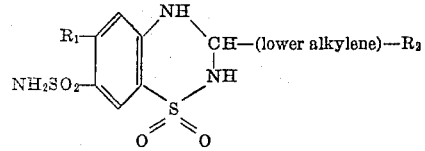

and alkali metal salts thereof, wherein $R_1$ is selected from the group consisting of chloro and trifluoromethyl, and $R_2$ is selected from the group consisting of furyl and thienyl.

2. 3 - furyl(lower alkyl) - 6 - trifluoromethyl - 7 - sulfamyl-3,4-dihydro-1,2,4-benzothiadiazine-1,1-dioxide.

3. 6 - trifluoromethyl - 3 - furfuryl - 7 - sulfamyl - 3,4-dihydro-1,2,4-benzothiadiazine-1,1-dioxide.

4. 6 - trifluoromethyl - 3 - [2 - (2 - furyl)ethyl] - 7 - sulfamyl-3,4-dihydro-1,2,4-benzothiadiazine-1,1-dioxide.

5. 3 - thenyl(lower alkyl) - 6 - trifluoromethyl - 7 - sulfamyl-3,4-dihydro-1,2,4-benzothiadiazine-1,1-dioxide.

6. 3 - thenyl - 6 - trifluoromethyl - 7 - sulfamyl - 3,4-dihydro-1,2,4-benzothiadiazine-1,1-dioxide.

7. 6 - chloro - 3 - thienyl(lower alkyl) - 7 - sulfamyl-3,4-dihydro-1,2,4-benzothiadiazine-1,1-dioxide.

8. 6 - chloro - 3 - thenyl - 7 - sulfamyl - 3,4 - dihydro-1,2,4-benzothiadiazine-1,1-dioxide.

9. 6 - chloro - 3 - furyl(lower alkyl) - 7 - sulfamyl - 3,4-dihydro-1,2,4-benzothiadiazine-1,1-dioxide.

10. 6 - chloro - 3 - furfuryl - 7 - sulfamyl - 3,4 - dihydro-1,2,4-benzothiadiazine-1,1-dioxide.

References Cited in the file of this patent

Freeman et al.: J. Org. Chem., vol. 16, pp. 815, 816, 818, 821, 828 (1951).

The Wall Street Journal, Nov. 5, 1958, p. 19 (Wash., D.C. edition).

Herrmann et al.: Texas State J. of Medicine (December 1958), pp. 854–858.

Holdrege: 135th Am. Chem. Soc. Meeting, Apr. 5–10, 1959.

Werner et al.: 135th Am. Chem. Soc. Meeting, Apr. 5–10, 1959 (publication date Mar. 9, 1959).

Disclaimer 3,001,994.—*Frederick Y. Wiselogle*, North Brunswick, and *Harry L. Yale*, and *Jack Bernstein*, New Brunswick, N.J. SUBSTITUTED DIHYDROBENZO-THIADIAZINES. Patent dated Sept. 26, 1961. Disclaimer filed Sept. 12, 1962, by the assignee, *Olin Mathieson Chemical Corporation*.

Hereby enters this disclaimer to claims 1, 7 and 8 of said patent.

[*Official Gazette October 16, 1962.*]

UNITED STATES PATENT OFFICE
CERTIFICATE OF CORRECTION

Patent No. 3,001,994                      September 26, 1961

Frederick Y. Wiselogle et al.

It is hereby certified that error appears in the above numbered patent requiring correction and that the said Letters Patent should read as corrected below.

Column 4, line 24, for "thenyl" read -- thienyl --.

Signed and sealed this 26th day of February 1963.

(SEAL)
Attest:

ESTON G. JOHNSON                          DAVID L. LADD

Attesting Officer                            Commissioner of Patents